United States Patent [19]

Monson et al.

[11] 4,323,369

[45] Apr. 6, 1982

[54] AIR CLEANER AND VENTILATOR

[75] Inventors: Donald R. Monson, West St. Paul; Harry R. Camplin, Marine on the St. Croix, both of Minn.

[73] Assignee: Donaldson Company, Inc., Minneapolis, Minn.

[21] Appl. No.: 178,897

[22] Filed: Aug. 18, 1980

Related U.S. Application Data

[63] Continuation-in-part of Ser. No. 36,318, May 7, 1979, abandoned.

[51] Int. Cl.³ .............................................. B01D 45/14
[52] U.S. Cl. ......................................... 55/1; 55/385 B; 55/396; 55/397; 55/406; 55/416; 55/431
[58] Field of Search .................... 55/1, 396, 400, 406, 55/431, 385 B, 358, 397, 416

[56] References Cited

U.S. PATENT DOCUMENTS

| | | | |
|---|---|---|---|
| 1,505,564 | 8/1924 | Jett | 55/406 X |
| 1,941,449 | 1/1934 | Sylvan . | |
| 2,039,127 | 4/1936 | Sylvan . | |
| 2,338,779 | 1/1944 | Mutch | 55/400 X |
| 2,420,840 | 5/1947 | Piquerez | 55/396 |
| 2,462,797 | 2/1949 | Whittaker | 55/396 |
| 2,562,007 | 7/1951 | Whittaker | 55/431 X |
| 2,657,802 | 11/1953 | Reed | 55/400 X |
| 2,698,745 | 1/1955 | Boucher | 55/400 X |
| 2,806,551 | 9/1957 | Heinrich | 55/396 X |
| 2,941,872 | 6/1960 | Pilo et al. | 55/400 X |
| 3,005,515 | 10/1961 | Caddell | 55/406 X |
| 3,107,988 | 10/1963 | Taylor et al. | 55/404 X |
| 3,785,128 | 1/1974 | Redemann | 55/406 X |
| 3,796,511 | 3/1974 | Hansen . | |
| 3,993,564 | 11/1976 | Novak | 55/400 X |

FOREIGN PATENT DOCUMENTS

| | | | |
|---|---|---|---|
| 554232 | 1/1960 | Belgium | 55/396 |
| 704536 | 5/1931 | France | 55/396 |
| 982943 | 6/1951 | France | 55/396 |
| 3846 | of 1890 | United Kingdom | 55/396 |
| 13930 | of 1915 | United Kingdom | 55/406 |
| 1146262 | 3/1969 | United Kingdom | 55/431 |

OTHER PUBLICATIONS

*Type D Roto-Clone*, Amer. Air Filter Co., Bulletin No. 272.

*Primary Examiner*—Kathleen J. Prunner
*Attorney, Agent, or Firm*—Merchant, Gould, Smith, Edell, Welter & Schmidt

[57] ABSTRACT

Apparatus and method for supplying clean air to a closed vehicle from an ambient source of air polluted with particulate matter. This is accomplished by drawing in air as a hollow cylindrical flow, converting it to the form of a flat sheet of air having components of motion radial and tangential with respect to an axis, deflecting the air by more than 90° to convert it to a conical whirling flow tapering toward the axis while retaining the tangential component of motion, purging from the flow particulate matter discharged centrifugally at the site of the deflection, skimming the conical flow to remove successive outer portions thereof together with the particulate matter centrifugally displaced thereinto, again deflecting the flow by more than 90°, in the opposite sense, to convert it to a flat whirling flow retaining the tangential components of motion and having a radially outward component of motion, converting the tangential component to pressure head, and discharging the flow radially as a sheet of air free from particulate polution.

14 Claims, 4 Drawing Figures

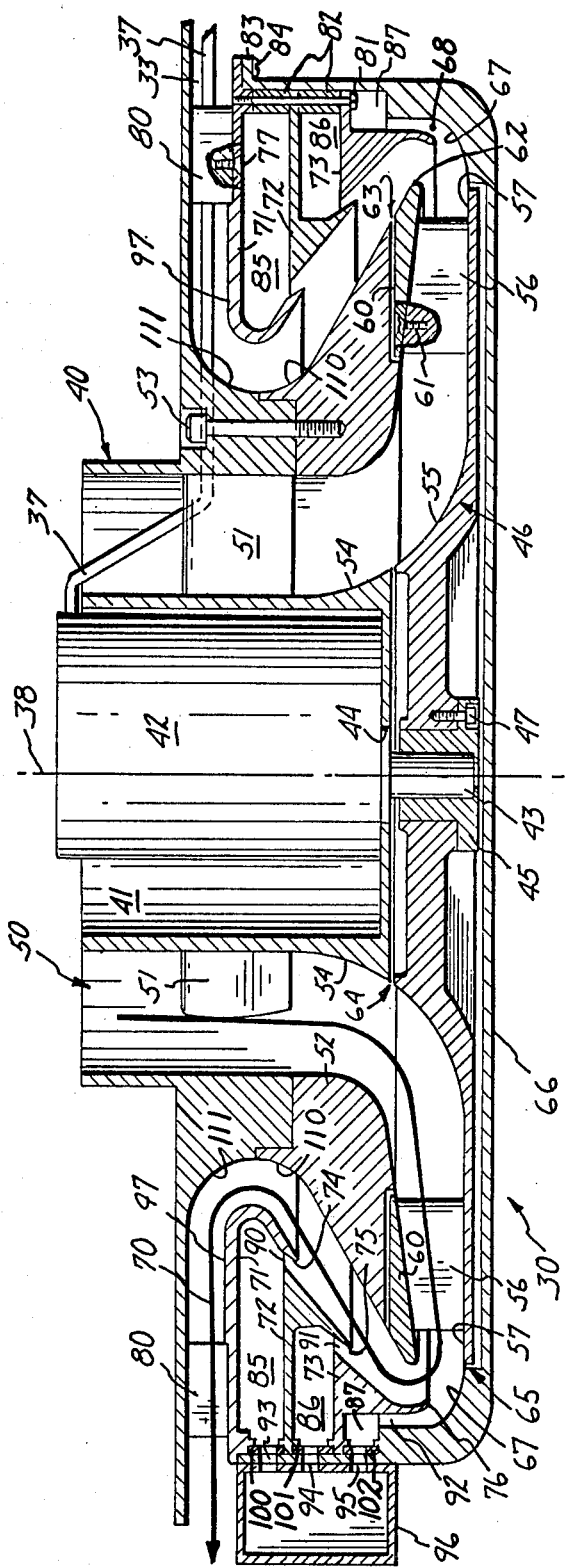
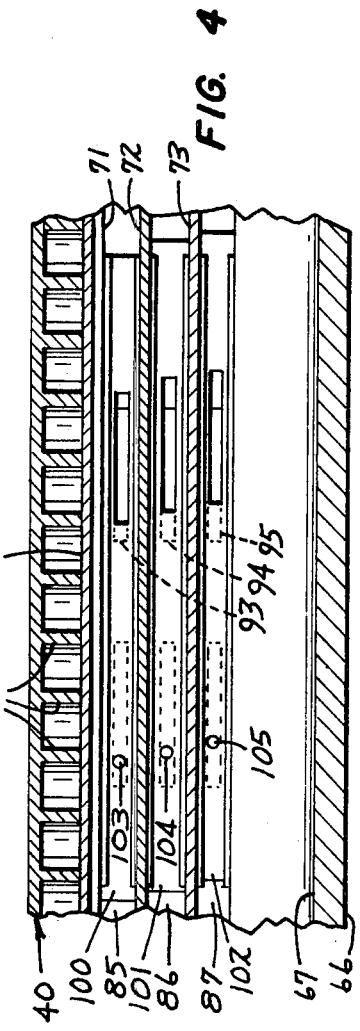
FIG. 3
FIG. 4

AIR CLEANER AND VENTILATOR

This is a continuation-in-part of our co-pending application 36,318, filed May 7, 1979 now abandoned.

BACKGROUND OF THE INVENTION

This invention relates to the general field of ventilation and dust separation, and particularly to ventilation equipment adapted for use in military armored vehicles. Such vehicles have historically presented some of the most difficult applications for dust separators and air cleaners. The problems result from the limited space available and the heavy dust concentrations frequently encountered by tracked armored vehicles. Dust concentrations outside the vehicle as high as twenty times zero visibility, that is, up to 0.5 grams per cubic foot of air, have been encountered. The vehicles are by no means hermetically sealed, and dust concentrations within the vehicles often can exceed zero visibility, defined as 0.025 grams per cubic foot of air. This dust can permeate communications equipment, gun breech mechanisms, optical instruments, turret bearings, and electronic equipment of all types. The result of such dust permeation is often premature equipment failure. Visibility within the vehicle is also impaired, and the crew members are often forced to wear masks to avoid inhaling the dust.

Most armored vehicles utilize crew compartment ventilation blowers, designed to provide ventilation air for the crew members and to assist in the removal of gun fumes. These blowers are air movers only, and in many cases act as dust pumps to accelerate the entry of dust into the vehicle.

SUMMARY OF THE INVENTION

The present invention comprises a powered ventilator-separator unit which functions to draw air from the outside atmosphere, separate particulate matter therefrom, circulate the cleaned air within the vehicle, and return the separated matter to the outside atmosphere. To accomplish this, dust laden air is drawn in axially and propelled radially outward by a centrifugal blower impeller with forward curved blades. The flow of air is abruptly converted to a whirling hollow cone, and the inertia of the dust particles causes them to migrate to the outer surface of the cone where they are removed and discharged from the vehicle. The cleaned air flow is reconverted to a radial outward flow through de-swirl vanes and is discharged within the vehicle as ventilation air.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

FIG. 3 is a sectional view taken along the line 3—3 of FIG. 2 to a still larger scale; and FIG. 4 is a developed view in elevation seen along the line 4—4 of FIG. 2.

DESCRIPTION OF THE PREFERRED EMBODIMENT

Figure 1:
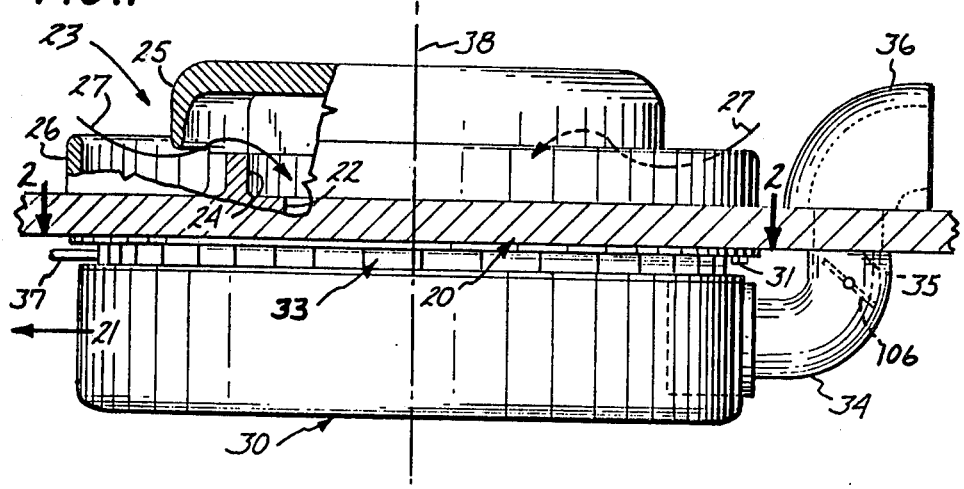
FIG. 1 is a general view in side elevation of the invention installed in a vehicle, parts being broken away.

In FIG. 1 the armored top wall of a vehicle is shown at 20, the front of the vehicle being in the direction shown by the arrow 21. An aperture 22 for admission of air into the vehicle from the outside atmosphere is protected against the entry of ballistic objects by a radially symmetrical armored labyrinth 23 including a cylindrical inner wall 24, a depending cap 25 supported on wall 24, and a cylindrical outer wall 26. The path of air from the atmosphere is suggested by the arrows 27. A ventilator-separator unit 30 is suspended in aperture 22 by fasteners 31, and supplies air, after cleaning it, to the interior of the vehicle through an annular array of openings 33, the air emerging from the opening as a sheet flowing radially outward from the unit. Purging means including a separate outlet conduit 34 receives matter removed from the air by unit 30 and discharges it to the outside atmosphere through a separate opening 35 in the vehicle roof, protected by armor 36. Energization for unit 30 is provided as shown schematically at 37.

Unit 30 is shown in detail in FIGS. 1 and 3 to be generally symmetrical about an axis 38. It comprises a housing 40 having a central chamber 41 in which a hydraulic or electric motor 42 is secured in any suitable fashion. The shaft 43 of motor 42 projects downward through an opening 44 at the bottom of chamber 41 and carries a hub 45 to which a rotor in the form of an impeller 46 is secured by suitable fasteners 47.

Chamber 41 is supported in an annular air inlet passage 50 by cross ribs 51 which may be of aerodynamic section if desired. A housing extension 52 is carried on housing 40 by fasteners 53, and cooperates with the outer surface 54 of chamber 41 on upper surface 55 of impeller 46 to define a passage for air which changes from the configuration of a hollow cylinder to that of a flat disk. A plurality of forwardly curved radial blades 56 project upward from impeller 46 outward of surface 55, but terminate inwardly of the periphery 57 of the impeller. As commonly understood in the industry and used herein, the term "forwardly curved" means that blades 56 are curved in or toward the rotational direction of impeller 46.

A ring or shroud 60 is secured to the tops of the blades 56 on impeller 46 by fasteners 61 passing into selected blades 56. It is configured as a prolongation of extension 52 and extends outward beyond blades 56 as a lip 62 to substantially the same extent as periphery 57 of the impeller. Shroud 60 has a close clearance with the housing extension 52 at 63. Close clearances also are maintained at 64 between impeller 46 and chamber 41, and at 65, between impeller 46 and a cover 66.

The inner surface 67 of cover 66 adjacent to blades 56 is given a paraboloidal cross section, which comprises a significant feature of the invention. In the section view shown in FIG. 3 the focus of the parabola is located at point 68. The axial component of movement of air through the unit is traced by heavy arrow 70, and it will be seen that the flow is converted at paraboloidal surface 67 from a radially outward whirling sheet to a whirling conical sheet tapering upwardly toward axis 38. A plurality of skimmers 71, 72 and 73 project into the outer portion of this conical sheet at sites 74, 75 and 76, respectively. Skimmer 71 is secured by fasteners 77 to selected ones of a plurality of de-swirl vanes 80 integral with the undersurface of housing 40. Skimmers 72 and 73 are secured to skimmer 71 by fasteners 81 and spacers 82. Cover 66 includes a flange 83 for securement to skimmer 71 by fasteners 84.

The spatial relation between cover 66 and skimmers 71, 72, and 73 results in a plurality of annular chambers 85, 86 and 87 to which access is had through annular slits 90, 91 and 92. Cover 66 is provided with short peripheral slots 93, 94 and 95 communicating with an outlet manifold 96 to which outlet conduit 34 is connected.

Separate throttling sliders 100, 101, and 102 having operating knobs 103, 104, and 105 are provided for individually varying the effective lengths of slots 93, 94, and 95. A throttling valve 106 may also be provided in conduit 34 for adjustment by a suitable actuator 107.

The upper surface 97 of skimmer 71 cooperates with surface 110 of extension 52 and surface 111 of housing 40 to convert the air flow from an upwardly tapering hollow cone to an outwardly directed flat sheet. This change in direction, like that accomplished at surface 67, is greater than 90 degrees.

The cross-sectional area of the path indicated by arrow 70 is substantially constant until it passes lip 76: thereafter the area progressively decreases at lips 75 and 74 respectively. After passing lip 74 the path area increases.

Operation

When hydraulic or electric power is supplied at 37, motor 42 drives impeller 46 to draw air from the ambient atmosphere outside the vehicle through passage 50 as a hollow cylindrical flow and to accelerate it radially, as a vortical sheet having a first component of motion radially outward from, and a second component of motion tangential about, axis 38. The change of direction of air flow from downward to outward has different effects on particles of different sizes. The ratio of the mass of a small dust particle to its area is so small that inertia cannot overcome the drag force of the air, and the particle changes direction with the air. The ratio of the mass of a larger particle with respect to area is sufficiently large that the force of inertia can overcome the force of the air, and the particle tends to continue in its direction rather than turning. Thus as the air moves across impeller 46 the larger particles migrate downward toward the boundary layer which moves with the impeller, and the smaller particles remain in the upper part of the flow including the boundary layer next to extension 52 and shroud 60.

The importance will now be apparent of forming lips 62 on shroud 60 rather than on extension 52. The boundary layer of the air moving across extension 52 is stationary about axis 38, because the extension is stationary. Small particles in the boundary layer would therefore be given no component of rotation about axis 38. On the other hand, the boundary layer of air moving across shroud 60 is rotating about axis 38 because the shroud is so moving, and the air movement is such as to apply to the smaller particles an inertial component of force which they otherwise would not receive.

The forward curve of blades 56 gives the flow a tangential velocity greater than that of the impeller itself. Blades 56 taper outwardly and coact with shroud 60, which rotates with them, to minimize turbulence. It is found that the unit operates satisfactorily at a low tip speed of 122 feet per second, which reduces erosion, power demand and noise.

As the air makes a second sharp turn, through more than 90 degrees, the inertia of the dust particles continues to carry them outwardly, and the larger particles impinge on surface 67. Some of these particles are massive enough to rebound, and the paraboloidal configuration of cover 66 at surface 67 "focuses" these particles into slit 92, to prevent them from re-entering the main air stream. Those particles pass through slit 92 with a small portion of the air from impeller 46, enter annular chamber 87, and are discharged through slot 95 into manifold 96.

The flow of air is now in the form of a whirling hollow cone, the dust particles being impelled outwardly by the centrifugal force. Progressively smaller particles are skimmed off with successive small portions of the air at slits 91 and 90. They pass into annular chambers 86 and 85 and thence, by slots 94 and 93 into manifold 96. The flow of air through slots 92, 91 and 90 is sufficient to carry the particles from manifold 96 through outlet 34, and discharge them outside the vehicle. It has been found that larger particles pass from slit 92 into manifold 96 with very little air flow, while greater and greater air flow is needed to carry smaller and smaller particles into manifold 96 from slits 91 and 90. The relation between the quantities of air discharged at slots 93, 94, and 95 is adjustable by setting sliders 100, 101, and 102, and the total amount of air thus discharged may be set by adjustment of actuator 107, which is provided to enable an optimum ratio to be obtained of cleaning efficiency to power consumption.

Figure 2:
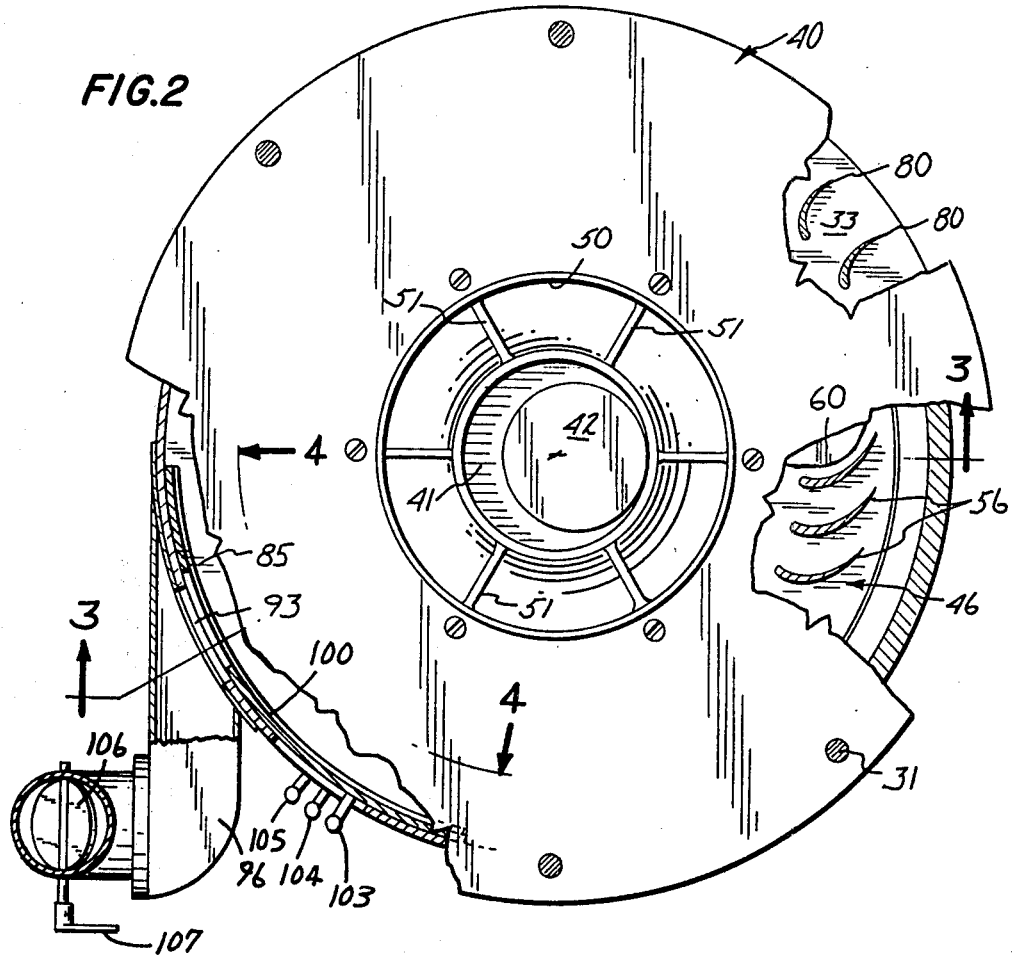
FIG. 2 is a plan view to a larger scale of the unit itself seen in the direction of arrows 2—2 in FIG. 1 and rotated through an angle of 180° about the axis of FIG. 1, parts being omitted or broken away.

The air again makes a sharp turn through more than 90 degrees, and its flow becomes that of a rotating sheet or whirling disk with a radially outward component. To this point the tangential component of air motion is retained. As the air passes through de-swirl blades 80, which are curved and oriented in a direction opposite to blades 56 as is best seen in FIG. 2, its tangential component is substantially converted to static pressure, and it leaves openings 33 with only a radially outward component of motion.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts within the principle of the invention, to the full extent indicated by the broad general meaning of the terms in which the appended claims are expressed.

What is claimed is:

1. Apparatus for removing entrained particulate matter from a gas, comprising:
    a circular housing having an annular inlet and circumferential outlet;
    an impeller mounted within said housing for rotation about an axis extending centrally through the inlet;
    means for driving said impeller;
    a plurality of generally radial first vanes secured at circumferentially spaced intervals about said impeller, said first vanes being oriented toward the rotational direction of said impeller;

a plurality of generally radial second vanes secured at circumferentially spaced intervals to said housing about the outlet, said second vanes being oriented against the rotational direction of said impeller;

skimmer means including a plurality of circumferential lips and associated scavenge chambers secured to said housing for defining with said housing and impeller a generally S-shaped cross sectional flow path between the inlet and outlet whereby the particulate matter is centrifugally scavenged before discharge of the gas through the outlet, the lips of said skimmer means extending progressively radially inward between a region adjacent to said impeller and a region immediately upstream of the outlet; and means connected to said housing for removing the particulate matter from the scavenge chambers of said skimmer means.

2. The apparatus of claim 1, wherein said first and second vanes are arcuate.

3. The apparatus of claim 1, wherein at least a portion of said housing immediately adjacent to and surrounding said impeller is of predetermined paraboloidal shape to facilitate ballistic collection of particulate matter of relatively larger size by the lip of said skimmer means disposed closest to said impeller.

4. The apparatus of claim 1, wherein said means for removing the scavenged particulate matter comprises:
said housing including a plurality of apertures therein, one aperture circumferentially opening onto each scavenge chamber of said skimmer means;
a plurality of movable sliders mounted on said housing, each slider being mounted over an aperture in said housing and including an opening for registry with an aperture in said housing;
means for individually controlling said sliders to throttle flow from the scavenge chambers of said skimmer means; and
a manifold secured to said housing, said manifold having an inlet and an outlet with the inlet being located over said sliders.

5. The apparatus according to claim 4, further including:
a valve mounted in the outlet of said manifold; and
means for controlling said valve.

6. Apparatus for removing entrained particulate matter from a gas, which comprises:
a circular housing having an annular inlet and circumferential outlet;
an impeller mounted within said housing and driven for rotation about an axis extending centrally through the inlet;
a plurality of generally radial first vanes secured at circumferentially spaced intervals about said impeller, said first vanes being oriented toward the rotational direction of said impeller;
a shroud ring secured to said first vanes in spaced relationship with said impeller for rotation therewith;
a plurality of generally radial second vanes secured at cirfumferentially spaced intervals to said housing about the outlet, said second vanes being oriented against the rotational direction of said impeller;
skimmer means including a plurality of circumferential lips and associated scavenge chambers secured to said housing for defining with said housing and impeller a generally S-shaped cross sectional flow path between the inlet and outlet whereby the particulate matter in the gas is centrifugally scavenged before discharge of the gas through the outlet, the lips of said skimmer means extending progressively radially inward between a region adjacent to said impeller and a region immediately upstream of the outlet;
at least a portion of said housing immediately adjacent to and surrounding said impeller being of a predetermined paraboloidal shape to facilitate ballistic collection of particulate matter of relatively larger size by the lip of said skimmer means disposed closest to said impeller; and
means connected to said housing for removing the particulate matter from the scavenge chambers of said skimmer means.

7. The apparatus of claim 6, wherein said first and second vanes are arcuate.

8. The apparatus of claim 6, wherein said means for removing the scavenged particulate matter comprises:
said housing including a plurality of apertures therein, each aperture circumferentially opening onto a scavenge chamber of said skimmer means;
a plurality of movable sliders mounted on said housing, each slider being mounted over an aperture in said housing and including an opening for registry with an aperture in said housing;
means for individually controlling said sliders to throttle flow of collected particulate matter from the scavenge chambers of said skimmer means; and
a manifold secured to said housing, said manifold having an inlet and an outlet with the inlet being located over said sliders.

9. The apparatus according to claim 6, further including:
a valve mounted in the outlet of said manifold; and
means for controlling said valve.

10. The apparatus of claim 6, wherein said impeller is driven by
means mounted on said housing.

11. Apparatus for removing entrained particulate matter from a gas, which comprises:
a circular housing having an annular inlet and circumferential outlet;
an impeller mounted within said housing for rotation about an axis extending centrally through the inlet;
means for driving said impeller;
a plurality of generally radial first vanes secured at circumferentially spaced intervals about said impeller, said first vanes being oriented toward the rotational direction of said impeller;
a shroud ring secured to said first vanes for rotation with said impeller;
a plurality of generally radial second vanes secured at circumferentially spaced intervals to said housing about the outlet, said second vanes being oriented against the rotational direction of said impeller;
skimmer means including a plurality of circumferential lips and associated scavenge chambers secured to said housing for defining with said housing and impeller a generally S-shaped cross sectional flow path between the inlet and outlet whereby the particulate matter in the gas is centrifugally scavenged before discharge of the gas through the outlet, the lips of said skimmer means extending progressively radially inward between a region adjacent to said impeller and a region immediately upstream of the outlet;

said housing including a plurality of apertures therein, each aperture circumferentially opening onto a scavenge chamber of said skimmer means;

a plurality of movable sliders mounted on said housing, each slider being mounted over an aperture in said housing and including a slot for registry with an aperture in said housing;

means for individually controlling said sliders to throttle flow of collected particulate matter from the scavenged chambers of said skimmer means; and a manifold secured to said housing, said manifold having an inlet and an outlet with the inlet being located over the slots in said sliders.

12. The apparatus of claim 11, wherein said first and second vanes are arcuate.

13. The apparatus of claim 11, wherein at least a portion of said housing immediately adjacent to and surrounding said impeller is of predetermined paraboloidal shape to facilitate ballistic collection of particulate matter of relatively larger size by the lip of said skimmer means disposed closest to said impeller.

14. A method of separating dust from air, comprising the steps of:

drawing dust laden air over a first path portion extending through an annular inlet by means of an impeller driven to rotate about an axis extending through the inlet;

deflecting the dust laden air over a second path portion extending radially outward and toward the rotational direction of the impeller by means of a plurality of vanes and a shroud ring secured to the impeller for rotation therewith;

deflecting the dust laden air through an obtuse angle over a third path portion extending inward and toward the axis by means of a predetermined paraboloidal surface disposed adjacent to and surrounding the periphery of said impeller;

skimming dust from the dust laden air by means of a plurality of circumferential lips extending progressively radially inward around the third path portion;

collecting the dust skimmed by the lips in a plurality of scavenge chambers associated with the skimmer lips;

discharging the collected dust from the scavenge chambers;

deflecting the air through an obtuse angle over a fourth path portion extending radially outward away from the axis; and discharging the air radially outward through a circumferential outlet by means of a plurality of deswirl vanes oriented against the rotational direction of the impeller.

* * * * *